(12) United States Patent
Mikkelsen

(10) Patent No.: US 8,578,398 B2
(45) Date of Patent: Nov. 5, 2013

(54) REGULAR EXPRESSION SELECTION FOR CONFIGURABLE APPLICATION DATA STEERING

(75) Inventor: Carl Mikkelsen, Wayland, MA (US)

(73) Assignee: Conexant Systems, Inc., Irvine, CA (US)

(*) Notice: Subject to any disclaimer, the term of this patent is extended or adjusted under 35 U.S.C. 154(b) by 72 days.

(21) Appl. No.: 13/149,713

(22) Filed: May 31, 2011

(65) Prior Publication Data

US 2012/0311613 A1  Dec. 6, 2012

(51) Int. Cl.
*G06F 9/44* (2006.01)
*G06F 15/173* (2006.01)

(52) U.S. Cl.
USPC .......................................... 719/328; 709/223

(58) Field of Classification Search
None
See application file for complete search history.

(56) References Cited

U.S. PATENT DOCUMENTS

| 7,623,257 B2 * | 11/2009 | Chase et al. ............ 358/1.15 |
| 7,673,031 B1 * | 3/2010 | Jalagam et al. .......... 709/223 |
| 7,814,111 B2 * | 10/2010 | Levin ........................ 707/756 |
| 8,189,225 B1 | 5/2012 | Lo et al. |
| 2008/0199199 A1 * | 8/2008 | Kato et al. ................... 399/81 |
| 2008/0263230 A1 * | 10/2008 | Mizuno et al. ............... 710/8 |
| 2009/0067347 A1 * | 3/2009 | Kimura ..................... 370/255 |
| 2010/0073707 A1 | 3/2010 | Ferlitsch |
| 2011/0007347 A1 | 1/2011 | Kamath et al. |
| 2011/0188063 A1 | 8/2011 | Nuggehalli et al. |
| 2011/0235085 A1 | 9/2011 | Jazayeri et al. |
| 2011/0255128 A1 | 10/2011 | Ozawa |
| 2011/0299110 A1 | 12/2011 | Jazayeri et al. |
| 2012/0057193 A1 | 3/2012 | Jazayeri et al. |
| 2012/0099146 A1 | 4/2012 | Stokes et al. |
| 2012/0140285 A1 | 6/2012 | Kamath et al. |

OTHER PUBLICATIONS

Wandile Sibewu and Mamello Thinyane "Architecting an SOA-based System for Sharing of Peripheral Network Resources".*

* cited by examiner

*Primary Examiner* — Lechi Truong
*Assistant Examiner* — Abdou Seye
(74) *Attorney, Agent, or Firm* — Jackson Walker L.L.P.; Christopher J. Rourk

(57) ABSTRACT

A system for application management. A plurality of applications, each having an associated precedence, an include data string and an exclude data string. A plurality of daemons, each for monitoring a data port and extracting a data stream received at the data port. A system manager for receiving the precedence, the include data string and the exclude data string for each application and an extracted data stream from one of the daemons and selecting one of the plurality of applications as a function of the precedence, the include data string and the exclude data string for each application.

10 Claims, 6 Drawing Sheets

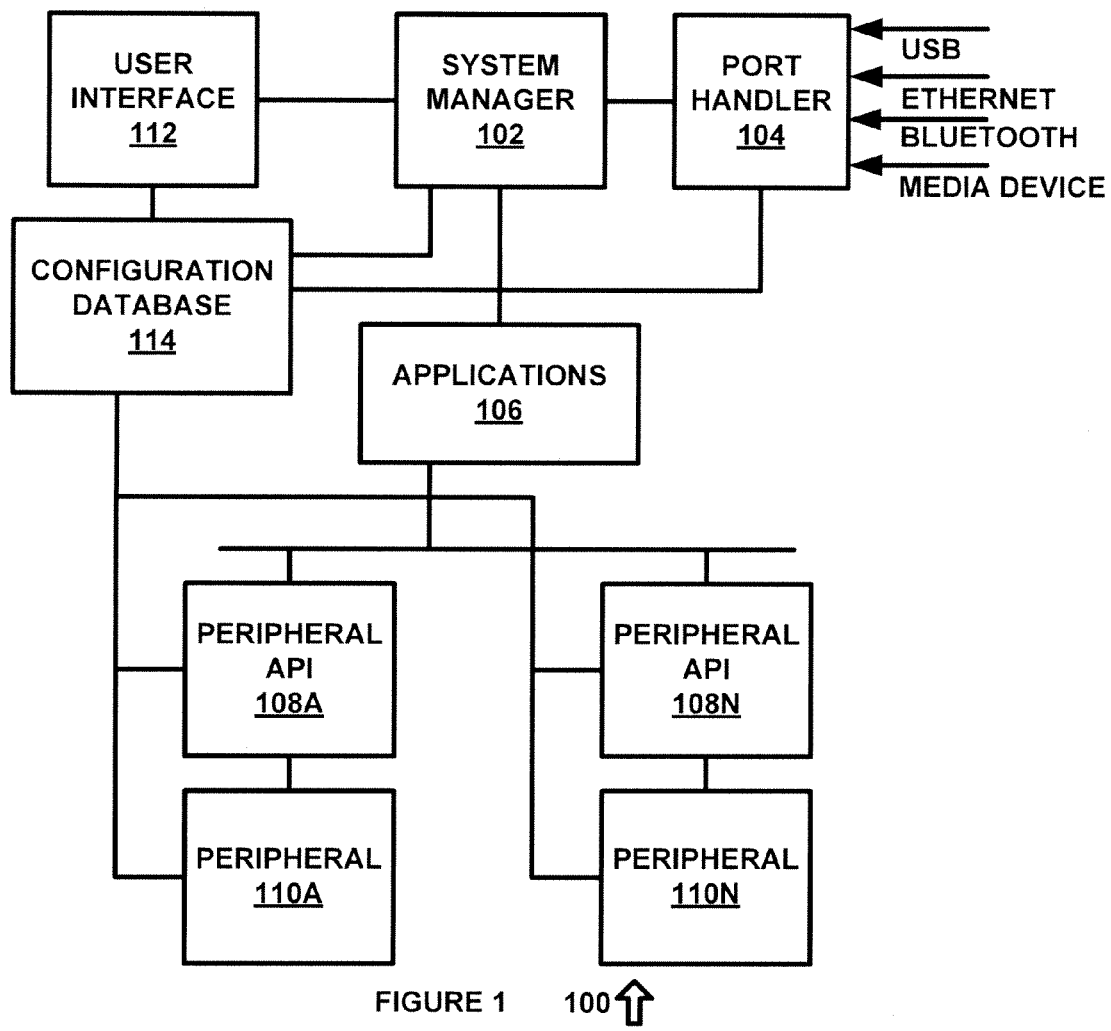
FIGURE 1    100
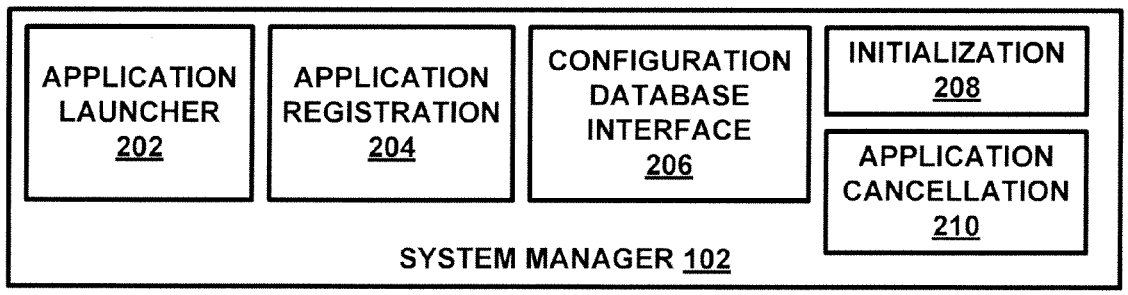
FIGURE 2    200

REGULAR EXPRESSION SELECTION FOR CONFIGURABLE APPLICATION DATA STEERING

RELATED APPLICATIONS

This application is related to the following commonly owned and co-pending applications, which are filed concurrently herewith and which are hereby incorporated by reference for all purposes: entitled "Persistent Data Storage;" entitled "Database Hierarchical Inheritance;" and entitled "Asynchronous Process Notification."

TECHNICAL FIELD

The application relates generally to multi-component systems, and more specifically to a system that selects a device or component in a multi-component system based on the data contained in a received data stream.

BACKGROUND OF THE INVENTION

An unsolved problem in a modular multi-component system is the means by which a plurality of input forms may be accepted from a plurality of sources such that the data is routed to an application processor suited to process that data form.

In traditional systems, this problem did not occur because each path by which data could be presented to the system was dedicated to a particular application processor. However, in current systems it is required to accept many forms of input over each input path.

The current practice is to provide for a specific set of input forms to be accepted on each of the known input sources. Routing code is devised for each input source to detect the variation in input form, and direct the data to the proper application processor.

As devices become more modular and configurable, the complexity of the routing code grows. Further, the full configuration of possible application processors must be known when the routing algorithm is devised, which complicates steering the input to the application processor in a modular device where the set of application processors may change from time to time.

SUMMARY OF THE INVENTION

A system for application management is provided. The system includes a plurality of applications, such as printer applications, each having an associated precedence, an include data string and an exclude data string. The system also includes a plurality of daemons, where each daemon can be used to monitor a data port and extract a data stream received at the data port. A system manager can receive the precedence, the include data string and the exclude data string for each application and an extracted data stream from one of the daemons, and can select one of the plurality of applications as a function of the precedence, the include data string and the exclude data string for each application. For example, if three applications have an include data string which matches the extracted data stream and one of these three has an exclude data string which matches the extracted data stream, the one having the exclude data string match will be excluded, and the application having the highest precedence of the remaining two applications will be selected.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a system in accordance with an exemplary embodiment of the present invention;

FIG. 2 is a diagram of system for providing system manager functionality in accordance with an exemplary embodiment of the present disclosure;

DETAILED DESCRIPTION OF THE INVENTION

Figure 3:
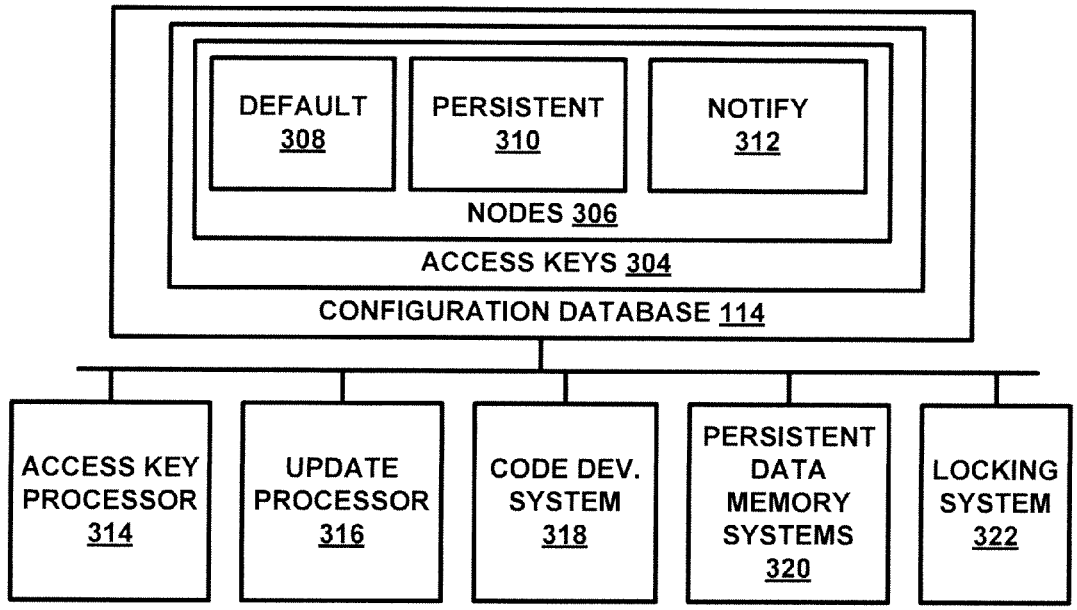
FIG. 3 is a diagram of a system for providing configuration database functionality in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for configuring and accessing a configuration database in accordance with an exemplary embodiment of the present invention. System 100 can be implemented in hardware or a suitable combination of hardware and software, and can be one or more software systems operating on a multi-function peripheral processor, a digital signal processor or other suitable general or special purpose processing systems.

As used herein, and by way of example and not by limitation, "hardware" can include a combination of discrete components, an integrated circuit, an application-specific integrated circuit, a field programmable gate array, a general purpose processing or server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 includes system manager 102, host communications 104, applications 106, peripheral application programming interface (API) 108A through 108N, peripheral 110A through 110N and configuration database 114. The control of resources is managed by the components that need the resources. For example, user interface 112, system manager 102 and applications 106 do not need to know the address of memory buffers or other resources that are needed by a peripheral 110A through 110N, such as a scanner or a printer.

System manager 102 determines whether an application can be started. For example, user interface 112 does not need to determine if the printer is currently printing. If a user enters commands into user interface 112 to start a copy operation, user interface 112 does not require data regarding resources that are currently busy. User interface 112 transmits command data to request system manager 102 to start the copy application. In one exemplary embodiment, this architecture can be used to eliminate system error, such as from race conditions between an application and a user requesting functions from user interface 112.

System 100 further includes peripheral API 108A through 108N, which can be a common API for applications 106 that are accessed by system manager 102. In one exemplary embodiment, user interface 112 can communicate parameters to applications 106 through configuration database 114 instead of the peripheral API 108A through 108N for applications 106. In this manner, the only data that system manager 102 needs to launch an application is the entry point.

Applications 106 register with system manager 102 by providing a name (as a string), and data that defines how to pass control to each application. For example, this data can include an entry point address, a command line that is used to launch the application, or other suitable data. In this manner, system manager 102 does not need to be pre-loaded with data that defines applications 106 that are built into a product that uses system 100. System manager 102 can manipulate applications, but does not need to maintain data that identifies which applications could exist, but only data about which applications do exist.

When user interface 112 or any other suitable system needs to invoke an application, a request is transmitted to system manager 102, which can start an application by name, by matching against the members of a class, or in other suitable manners. To match against a class, the requesting system transmits a string to system manager 102, such as the first bytes from a file to be processed, and a class name. System manager 102 matches the string against the regular expressions registered with each application, looking for a match. If a match is found, the application name is used as if the name had been provided to system manager 102 as the application name.

FIG. 2 is a diagram of system 200 for providing system manager 102 functionality in accordance with an exemplary embodiment of the present disclosure. System 200 includes system manager 102 which is further composed of application launcher 202, application registration 204, configuration database interface 206, initialization 208 and application cancellation 210, each of which can be implemented in hardware or a suitable combination of hardware and software.

Application launcher 202 can be provided for use with a user interface function and other parts of system 100 that need to start an application or monitor the status of an application. Such user interface functions can also allow the status of the application to be determined. For example, a gross status indicator can be used to provide information about the current execution state of the application, such as whether execution is pending, has been started, has started and failed, has completed, or other suitable state information. Communication of the status between the user interface (or other system) and the application is accomplished using configuration database 114.

Applications can be launched into a suitable execution slot by immediately being launched through a start API, by being launched later after a user-defined delay through a delay API (such as to launch applications at a scheduled time), or in other suitable manners. In one exemplary embodiment, system manager 102 can create an activity node and return a node reference through an "activity" parameter. A persistent node can also be used to store application launch information so that a loss of power before the application is launched does not prevent the application from starting.

Application registration 204 registers applications with configuration database 114 and other suitable systems. In one exemplary embodiment, an application can be named using a hierarchical naming scheme, such as an XML-based scheme, so as to allow the application name to also be a node identifier in configuration database 114. An application can also be registered as a member of a class.

Configuration database interface 206 provides an application programming interface or other suitable interface to configuration database 114. In one exemplary embodiment, configuration database 114 can be used by system manager 102 and other systems to communicate status information or other suitable information for applications or other components of system 100. System manager 102 thus interfaces with configuration database 114 through configuration database interface 206 to start or terminate applications, to facilitate communications between applications or components, or for other suitable purposes.

Initialization 208 performs initialization operations for system manager 102 and configuration database 114, such as to initialize a number of processor slots, to allocate memory, and to perform other suitable operations. In one exemplary embodiment, an estimated size is obtained to determine an amount of memory to be reserved for the database storage, such as by using an average number of size times a number of database entries or in other suitable manners. Initialization 208 can populate configuration database 114 with initial contents, such as by using a bulk population procedure. Bulk population of the database can be done 1) using an XML stream that adheres to the hierarchical naming schema, 2) by pointing to an object that contains such an XML stream, 3) from streams that follow the proprietary format in which persistent objects are stored, or in other suitable manners. A complementary function can be used to convert a database context into a bulk structure. In another exemplary embodiment, API calls can be used to set the initial contents of nodes associated with the keys of configuration database 114.

Application cancellation 210 performs cancellation processing for an application that has been scheduled, an application that is in operation, or other suitable activities. Typically, a cancellation routine is required to cancel an application or activity. An activity can be cancelled where the application itself will not be cancelled, such as a print job for a printer. Two APIs can be provided to assist with canceling such activities. The first API can be a helper function that provides a list of activities that can be canceled, such as with an option to retrieve only the activity of the highest hierarchy if the intention is to cancel the application. The second API can be used to trigger a cancellation of an activity. For example, if an activity has not started (such as a delayed start application), then the node can be deleted and a callback can be made to let the associated client know that the application was cancelled and never started. For an application that has never started, the cleanup function can still be called at the end of the cancellation procedure.

Application cancellation can provide the callback indirectly, where a piece of code that requires confirmation of a completed cancel is registered for a notification function through configuration database 114 for the node. The reapplication cancellation can also be provided through a configuration database 114 node or in other suitable manners, such as for debugging or other suitable purposes. The calling thread information and current time can also be recorded before submitting the activity to application cancellation 210 for canceling the activity. The activity is deemed canceled when the activity sets its completion status in configuration database 114. Application cancellation 210 can then delete the activity from an activities tree.

In operation, system 200 provides system manager 102 functionality that is used to manage operations of the components of system 100 in accordance with the present disclosure. System 200 uses configuration database 114 to communication between components of system 100.

FIG. 3 is a diagram of a system 300 for providing configuration database functionality in accordance with an exemplary embodiment of the present disclosure. System 300 includes configuration database 114 and access keys 304, nodes 306, default nodes 308, persistent nodes 310, notify nodes 312, access key processor 314, update processor 316, code development system 318, persistent data memory systems 320 and locking system 322, each of which can be implemented in hardware or a suitable combination of hardware and software.

Access keys 304 are used to access data stored in configuration database 114. An access key can be named using a hierarchical naming schema, such as an XML-compliant naming schema. In one exemplary embodiment, an XML-based naming schema might result in an access key having a value of "/A/B/C/D," where a text string is associated with each of the variables A through D.

Nodes 306 refer to the data strings stored within configuration database 114. A node can be characterized as a key value that contains sub-keys, and the terms "node," "key," "sub-node" and "sub-key" can refer to the same data structure, but connote different relative meanings. For example, a key is used to locate a node, and the node associated with the key will typically include additional data beyond that data that defines the key. Likewise, a node may have associated sub-nodes, where the key that is used to locate a node can also be used to locate the associated sub-nodes. Data can be stored in a node in a suitable predetermined data format. A node can also have associated sub-nodes, such as default nodes 308, persistent nodes 310 and notify nodes 312 or other suitable sub-nodes.

Default nodes 308 are used to provide data for a node that is automatically constructed. In one exemplary embodiment, a node can be automatically constructed in configuration database 114 in order to allow systems and components of system 100 to communicate with each other. In this exemplary embodiment, a default node can be created as a sub-node for a related class, such as a print sub-node for data that defines a print job. The new print sub-node can contain all of the data required for the print job to be processed, and can be created as a print node sub-node, where the default node settings, notification node settings and persistent node settings are used to coordinate processing of the print job, as further described herein.

A default node value can be stored in configuration database 114 and associated with a node. Access key processor 314 can return the default node value as part of a revised input value. For example, access key processor 314 can be configured to return part of the input value as part of the revised input access key, where a hierarchical naming schema such as an XML-compliant naming schema or other suitable schema are used. In this exemplary embodiment, an XML-based naming schema might result in an input of "/A/B/C/D" to access key processor 314, and a default node value may exist for "/A/B/C," "/A/B" or "/A." The default node value can be used to provide the root for a new input key, such as "/X/Y/Z," where the entire new input key would be "/X/Y/Z/D." A default node value can be generated if an associated node value is not stored in the configuration database for an associated key value.

A node can have a default sub-node that is used to handle a request for information, which is presented by submitting a key value for a node, when there is no associated information stored at the node for that key value. The default sub-node can contain a name of another node that can be searched to satisfy the request. Rather than giving each key a default value, an hierarchal system of inheritance can be provided that determines defaults. For example, if a node value for key is not found in the database, a SOUGHT_NAME variable can be set to be the final name in the key. In this example, if the key is "/A/B/C/D/NumCopies", then SOUGHT_NAME would be set to "NumCopies". A SEEKING_NODE variable can be set to be the key with the final slash and name removed. Using the above example, in the above case, EKING-NODE would be "/A/B/C/D." if a default value for SEEKING_NODE exists, a new key is constructed based on the value. In the above example, if the value of "/A/B/C/D/DEFAULT" is "/X/Y/Z", then the new search is set to be to be "/X/Y/Z/Numcopies," and the search is repeated using the new key. If the SEEKING_NODE is equal to the root value, such as "/," then the search has failed. If no value for the default in the SEEKING_NODE exists, the final name is moved from the end of SEEKING_NODE to SOUGHT_KEY. For example, SOUGHT_NAME becomes "D/NumCopies", and SEEKING_NODE becomes "/A/B/C," and the search is repeated again.

Persistent nodes 310 are nodes containing data that is stored in a persistent electronic memory, such as NVRAM. Persistent node data can be stored using string keys and simple values in a tagged, self-describing data structure, unlike the anonymous, untagged (i.e. not self-describing) structures stored in NVRAM with a standard NVRAM API. Storing data in a string-based, self-describing structure is less storage efficient than pure binary encoding, but one benefit of string-based storage is that when different versions of firmware that utilizes the data are stored to a flash memory device, the database remains intact and usable. In an untagged data structure, the data would be preserved, but if the binary layout of the data changed, it would be unusable to new firmware. For such new firmware, any stored values would automatically revert to "factory default" settings. By using a tagged data structure, any new values will assume the factory default values, but any pre-existing values will be preserved.

To associate a portion of the database with a record in NVRAM or other suitable nonvolatile memory, the value of a persistent node identifier is set to equal the name of the NVRAM object, and a "persistent" key is associated with the node. All nodes or sub-nodes under the node can also be serialized into the object, and nodes at various sections of a database tree can be assigned to the same NVRAM object.

In one exemplary embodiment, persistent nodes 310 can be used to prevent interruption of scheduled tasks if a loss of power occurs. In this example, if a print job has been created and stored to a print node, the print job can inherit a default persistent node setting, such that the print job node data is backed up in persistent data memory systems 320, and is only deleted from persistent data memory systems 320 when the print job completes. In this manner, the print job data can be restored if a loss of power occurs before the print job completes.

Notify nodes 312 are utilized by the configuration database to transmit change data to any component that needs to know when a change occurs to a node. In one exemplary embodiment, a "notify" node or tag (such as a data field contained within a node) can be attached or associated with the selected node. The node associated with the notify tag can contain notification data (such as a single value), can be a node that contains sub-nodes, or can be other suitable data structures. In this exemplary embodiment, pairs of addresses and parameters can be associated with or stored in the notify node. When the notify node is triggered, each of the functions identified by the address can be called with the given parameter and a reason for why the function is called (such as when the node has changed, when the node has been deleted, or when a new sub-node has been added).

In another exemplary embodiment, a user interface system can be used to monitor processes such as print jobs. In this exemplary embodiment, control of the print jobs can be coordinated between user interface 112 (which receives user entered control data), system manager 102 (which launches the printer application in response to the user-entered control data), the peripheral 110A through 110N (that is associated with the printer) and other components of system 100, each of which communicate through configuration database 114 by accessing data stored in nodes of configuration database 114. The print job data can be stored to a new node that is a sub-node of a print node, where the print node includes an associated notify node that notifies the associated printer that a print job is available and needs to be retrieved for processing. The new node can be created using data stored in one or more default nodes associated with the print node or sub-nodes (such as sub-nodes for specific printers or types of print data). As the print job is processed, status updates can be transmitted from the printer back to configuration database 114 (such as "printing," "offline," or "finished"), and a notify node associated with the printer status node can transmit the status data to user interface 112. In this manner, all communication can be handled through configuration database 114 without the need for a communications infrastructure.

Access key processor 314 can receive an input value, such as an input key, and return the associated node value for the input value if the input value matches an access key. In general, the access key will be stored in first memory device sector and the associated node data will be stored in a second memory device sector, but the keys and nodes can also or alternatively be stored in separate memory devices. If the input value does not match an access key stored in the first memory device sector, then access key processor 314 generates a revised input value containing a default node value, if one exists. In one exemplary embodiment, access key processor 314 can modify the input key to search for a default node value, such as by using a root portion of the input key to search for an associated default node value or default search key, and returns a search failed indication if no default node value is stored in the second data memory device sector and associated with the portion of the input value.

Update processor 316 can process notification field data if data associated with a notify node 312 is modified. In one exemplary embodiment, update processor 316 can retrieve a function stored in a sub-field of the notification field and can execute the function, such as to transmit other sub-fields contained within the notification field data to an address stored in a sub-field of the notification field. As previously discussed, the address can be associated with a component of system 100, such as user interface 112, one of peripherals 110A through 110N, or other suitable components.

Code development system 318 allows a user to associate default nodes 308, persistent nodes 310, notify nodes 312 or other suitable nodes with nodes or components are stored in configuration database 114 while creating applications for use with system 100. In one exemplary embodiment, a user can: identify data as being required for a default node, such as to accommodate and configure new peripherals; identify data as being required to be stored as persistent data, such as user preference settings for peripherals; and identify a component or system that should be notified if a node is changed, deleted or if sub-nodes are added, such as for a status indicator on a user interface. Other suitable applications can also or alternatively be created using code development system 318, and code development system 318 provides the functionality for creating applications or other software code that utilizes the data functions and structures disclosed herein.

Persistent data memory systems 320 are one or more non-volatile data memory devices that are used to store configuration data, such as user preferences. Persistent data memory systems 320 can be updated in conjunction with persistent nodes 310 or in other suitable manners.

Locking system 322 locks nodes and sub-nodes based on data received from systems and components that access the nodes, to control simultaneous access. The operation to lock a node returns an access code or visa that must be presented with subsequent requests to access, in order to unlock the node. In one exemplary embodiment, when a key is accessed by a function, three parameters can be passed: the context, the name, and the visa. When a lock operation is performed on the node, the node is said to have a "direct lock". All sub-nodes inherit the locked stare and the visa, and are said to have an "inherited lock." A node with a direct lock may not be locked again, whereas a node with an inherited lock may be locked if the visa is presented. If the visa is correct, a new visa will be returned, and that new visa must be used to access the node and its contents. The inherited lock will no longer give access to the node and its contents. When a node is locked, all reads, writes, and locks are prohibited unless the proper visa is passed with the call. Notification and persistent data processing are not performed immediately for a locked node. When a node is unlocked and is not contained within any other locked node, any pending notifications and persistent data processing is performed.

In operation, system 300 facilitates communication between components and systems of system 100 through configuration database 114. Through the use of default nodes 308, persistent nodes 310 and notify nodes 312, these components and systems can communication with each other and process data, such as data for a multi-function peripheral or other suitable data.

Figure 4:
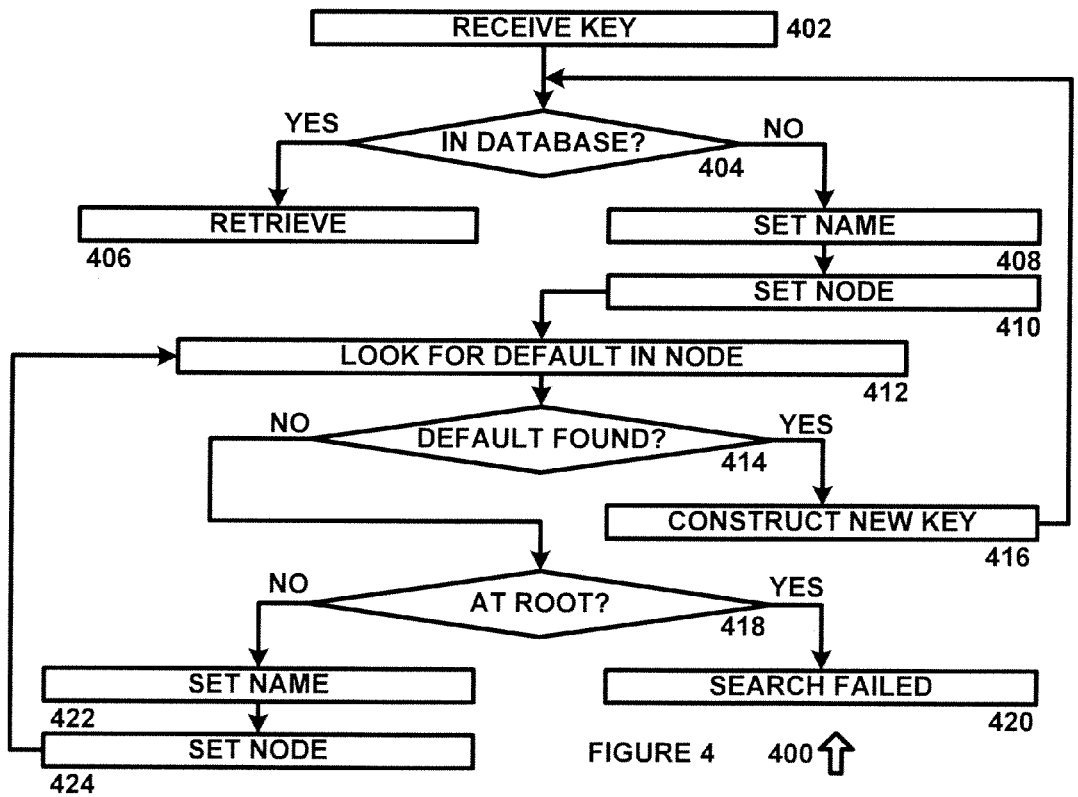
FIG. 4 is a flow chart of an algorithm for processing a key to identify a default node in accordance with an exemplary embodiment of the present disclosure.

FIG. 4 is a flow chart of an algorithm 400 for processing a key to identify a default node in accordance with an exemplary embodiment of the present disclosure. Algorithm 400 can be implemented in hardware or a suitable combination of hardware and software, such as by converting the flowchart algorithm to software code that will operate on a multi-function peripheral processor using standard programming techniques.

Algorithm 400 begins at 402 where a key is received. The key can be received as encoded data from system manager 102 or other suitable systems, and can have a predetermined data format that is defined by a number of fields and data type (such as alphanumeric). The key can be named using a hierarchical naming convention, such as an XML naming convention, or in other suitable manners. For example, the key can be named A/B/C/D, where A-D can be any suitable text string. The algorithm then proceeds to 404.

At 404, it is determined whether the key matches a key value in the configuration database. The match can be determined using a suitable matching or look-up algorithm, such as an algorithm that searches through an ordered list or other suitable algorithms. If a match is found, the algorithm proceeds to 406 and the value corresponding to the key is retrieved from the database, such as by copying a data field stored in the database that is associated with the key. Otherwise, the algorithm proceeds to 408, where a name is set. In one exemplary embodiment, the name can be set by using the least significant text string of the hierarchical key name, such as the text string associated with "D" in the example above, or in other suitable manners. The algorithm then proceeds to 410, where the node is set. In one exemplary embodiment, the node can be the remainder of the key name other than the least significant text string, such as "A/B/C" in the example above. The algorithm then proceeds to 412.

At 412, it is determined whether a default name value exists for the node assigned in 410. If it is determined at 414 that a default name has been found, the algorithm proceeds to 416 where a new key is constructed using the default name and the name set at 408. For example, if the default name value is "X/Y/Z," then the new key would be "X/Y/Z/D." The algorithm then returns to 404.

If it is determined at 412 that no default name value exists, the algorithm proceeds to 418, where it is determined whether the key is at a For example, using the naming convention discussed above, if the remaining key is "/D," then the key is at a root (i.e. "/") and no additional searching can be performed. The algorithm proceeds to 420 where a search failed indicator is generated. Otherwise, the algorithm proceeds to 422 where the name is set. Using the above example, the new name setting when the search for "/A/B/C/D" has not resulted in an associated node or a default for "/A/B/C," the new name would be "/C/D" for the second default node search. The algorithm then proceeds to 424 where the node is set, such as to "/A/B," for the example described above. The algorithm then returns to 412, where a search for a default node for the new node value is performed.

In operation, algorithm 400 allows a default node value structure to be used in a configuration database that allows default values for nodes to be assigned to identify information for an unidentified node. Algorithm 400 seeks for the default value that is closest to the new node value by checking each node in a hierarchical naming scheme for a default node value, starting with the node closest to the new node in the naming scheme and ending with the root node, after which a search failed indicator is returned.

Figure 5:
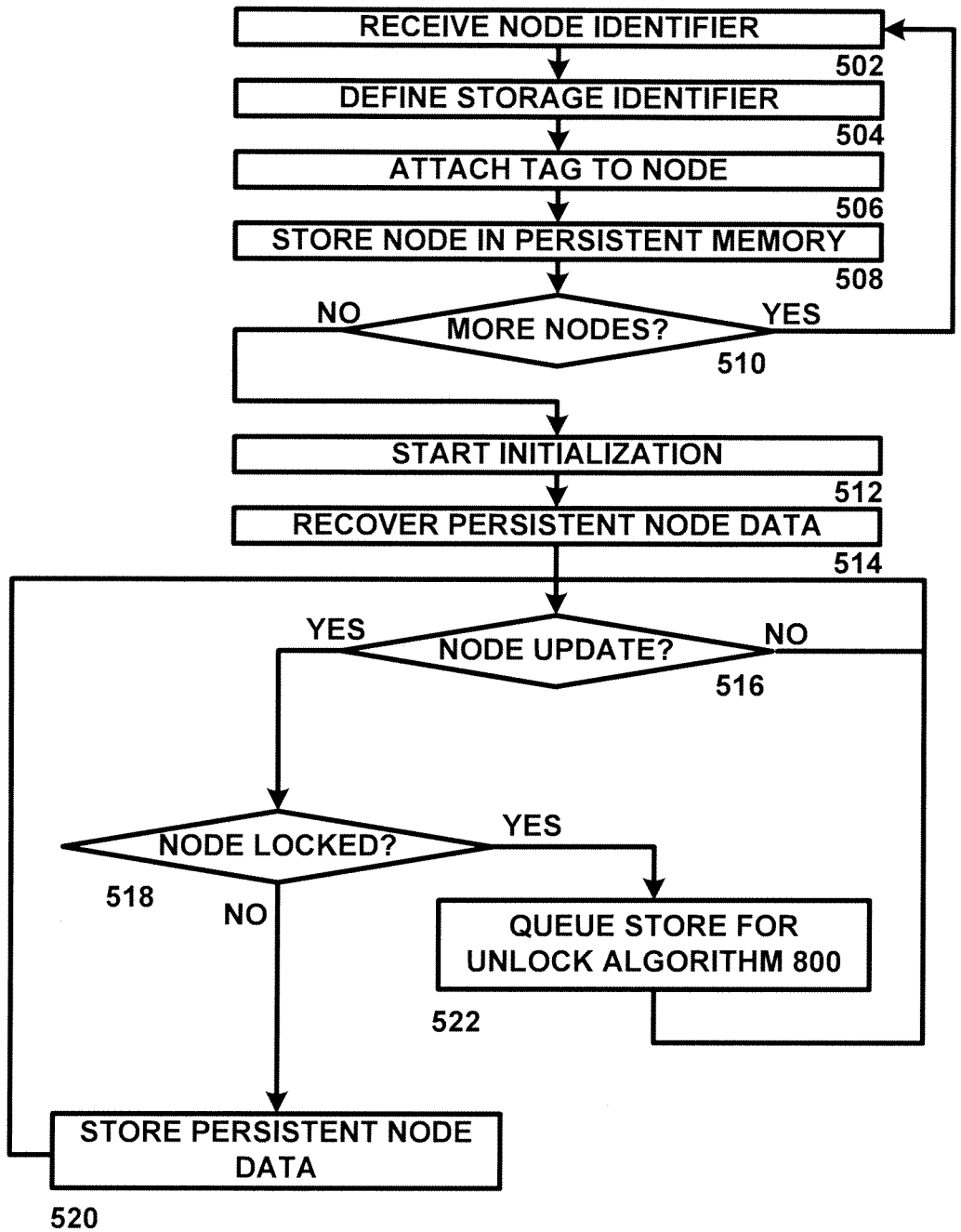
FIG. 5 is a flow chart of an algorithm for persistent storage of data associated with a node in a configuration database in accordance with an exemplary embodiment of the present disclosure.

FIG. 5 is a flow chart of an algorithm 500 for persistent storage of data associated with a node in a configuration database in accordance with an exemplary embodiment of the present disclosure. Algorithm 500 can be implemented in hardware or a suitable combination of hardware and software, such as by converting the flowchart algorithm to software code that will operate on a multi-function peripheral processor using standard programming techniques.

Algorithm 500 begins at 502 where a node identifier is received. In one exemplary embodiment, the node identifier can be received when the node is created using a software development kit as part of an application that uses a configuration database to store data associated with the node or in other suitable manners. The algorithm then proceeds to 504.

At 504, a storage identifier is defined, such as by using the software development kit to identify a persistent data memory device, such as a nonvolatile data memory device, a magnetic drive, an optical data storage device or other suitable persistent data memory devices. The algorithm then proceeds to 506.

At 506, a tag is attached to a node that associates the data stored at the node with a storage identifier. In one exemplary embodiment, the tag can be attached to the node when an application is being created or modified by a programmer, such as when the programmer indicates that data should be stored in a persistent data storage device. The algorithm then proceeds to 508.

At 508, the node data is stored in the associated persistent data memory device. In one exemplary embodiment, the node data can be stored when it is created for each node, the node data can be stored after programming for a module or application has been completed, or other suitable processes can be used. The algorithm then proceeds to 510.

At 510, it is determined whether more nodes are to be generated or processed. If it is determined that more nodes are to be generated or processed, such as when an application is being developed or compiled, the algorithm returns to 502. Otherwise, the algorithm proceeds to 512.

At 512, a database is initialized. In one exemplary embodiment, the initialization can be performed for a configuration database when a multi-function peripheral is powered on or in other suitable manners. The algorithm then proceeds to 514.

At 514, persistent node data for the nodes of the database is recovered. In one exemplary embodiment, the nodes of the database with associated tags can be identified, and the data stored in persistent memory devices can be retrieved and used to populate the database. The algorithm then proceeds to 516.

At 516, it is determined whether a node has been updated. In one exemplary embodiment, a node can be used to store user settings for devices such as printers, fax machines, or other suitable peripherals. When a user changes a setting, the setting data can be stored at a node in a configuration database. If a node has not been updated, the algorithm returns and waits for a node to be updated. Otherwise, the algorithm proceeds to 518.

At 518, the node is checked to see if it is locked. If the node is locked, the algorithm proceeds to 522. If the node is not locked, the algorithm proceeds to 520.

At 520, the updated node data is stored in the persistent data memory device. In one exemplary embodiment, the persistent data memory device can be identified using the tag data and the updated node data can be stored in the associated persistent data memory device using a suitable data storage process. The algorithm then returns to 514.

At 522, the information to update the associated persistent data memory device is queued for later processing by an unlock algorithm.

In operation, algorithm 500 allows data that should be maintained in a persistent data memory device to be easily identified, updated and recovered. Algorithm 500 can be used by programmers during the application coding process to create a structure within the application code for providing for persistent storage of selected data that is determined by the developer to be suitable for persistent storage, such as user setting selections for peripheral devices.

Figure 6:
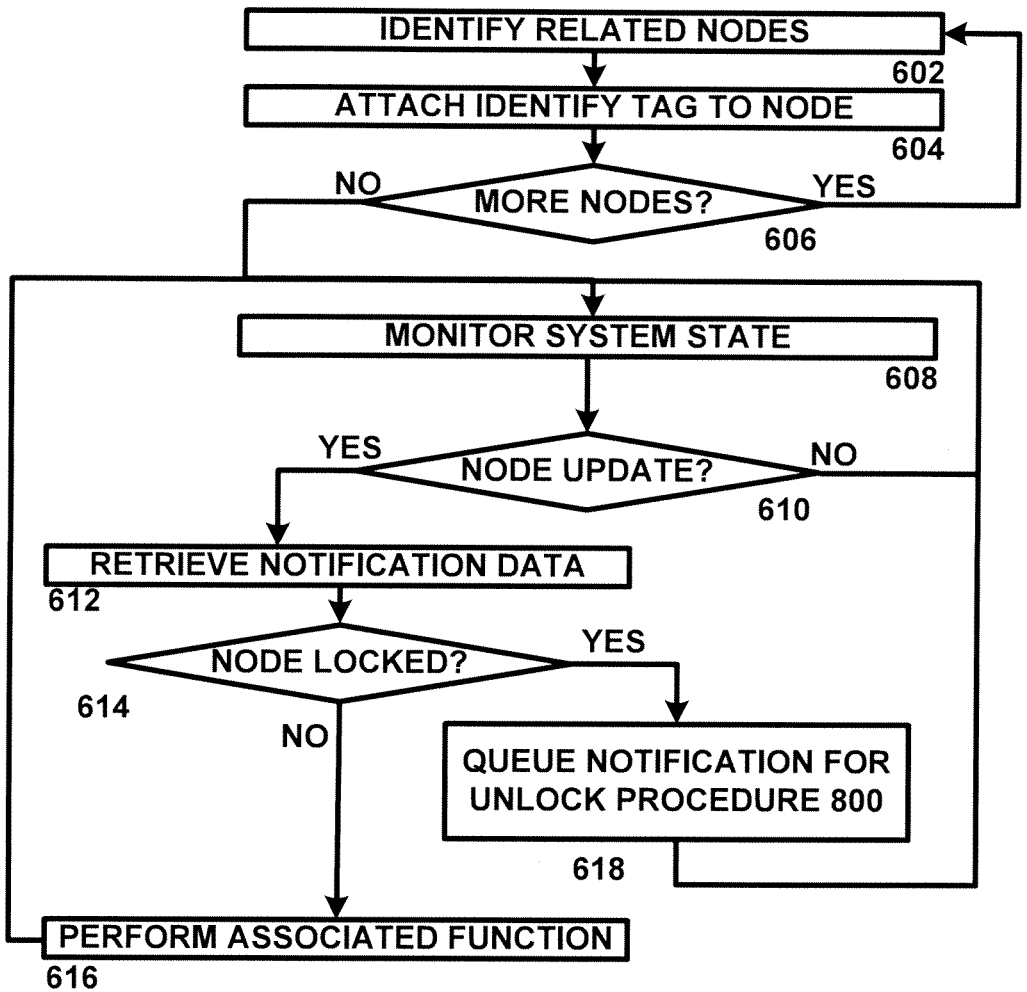
FIG. 6 is a flow chart of an algorithm for generating notification data a database node in accordance with an exemplary embodiment of the present invention.

FIG. 6 is a flow chart of an algorithm 600 for generating notification data for a database node in accordance with an exemplary embodiment of the present invention. Algorithm 600 can be implemented in hardware or a suitable combination of hardware and software, such as by converting the flowchart algorithm to software code that will operate on a multi-function peripheral processor using standard programming techniques.

Algorithm 600 begins at 602, where a related node for an application is identified. In one exemplary embodiment, the node can be identified using a function for retrieving or setting a key value, such as a key value "get" function or a key value "set" function. In this exemplary embodiment, a set function which implies nodes that do not exist can cause those nodes to be created. If a type of the key does not result in a match when a "get" function that uses the key as an argument is called, the function can return an error, whereas if the type of a key does not match when a "set" function is called, the type can be changed.

A "set" function call can create a key in the context if it does not already exist, and a "get" function call can return a value from a default setting, if a default setting exists. A "set" function call does not change the default. In addition, after a "set" function call, any node having an associated persistent tag is updated in the persistent data memory if it is not locked. If the node is locked, the update can be delayed until all locks are removed from the node.

After a "get" or "set" function call, notification processing can be performed by looking in the node that contains the changed key for a "notify" tag. If a "notify" tag is present and the node does not have a lock, a configuration database system manager can call each of the entries in the "notify" tag and search for each of the containing contexts. If a context is present and the node is has a lock, the notification can be delayed until all locks are removed from the node, such as where bottom-up processing is necessary so that a subscription to a lower level node does not interrupt subscriptions to a higher level node.

For a notification "get" or "set" function, an address of the function to be called for notification can be provided, as well as a value for the first argument to be passed to the notification function. Additional data, such as a reason parameter, can be provided that identify a reason that a notifier was called, such as an object add, an object delete, an object change, other suitable reasons or a combination of suitable reasons. Restrictions can also be imposed on the notification function, such as to prevent a configuration database application programming interface from being called from the notification callbacks. The algorithm then proceeds to 604.

At 604, a notification tag is attached to the node. As discussed above, the notification tag can include an address of a function to be called, a value for a first argument, or other suitable data. The algorithm then proceeds to 606.

At 606, it is determined whether any additional nodes are to be processed. If no additional nodes are to be processed, the algorithm proceeds to 608, otherwise the algorithm returns to 602.

At 608, a system state is monitored, such as by a system manager of a configuration database or other suitable systems. The algorithm then proceeds to 610 where it is determined whether a node has been updated, such as if an object has been added, changed, deleted or if other suitable node updates have occurred. If no update has occurred, system state monitoring continues. Otherwise, the algorithm proceeds to 612.

At 612, notification data associated with a node is obtained, as discussed above. The algorithm then proceeds to 614.

At 614 it is determined if the node is locked. If the node is not locked, the algorithm proceeds to 616 where the associated function is called, as described above. If the node is locked, the algorithm proceeds to 618.

At 616 the notification function is called with the notification function argument and the reason for the notification. The algorithm then proceeds to 608 to wait for the next change.

At 618 the notification function, the notification function argument, and the reason for the notification are queued for subsequent processing by an unlock algorithm. The algorithm proceeds to 608 to continue monitoring for changes to the node or nodes.

In operation, algorithm 600 allows a component to be notified when a change occurs to a related node. Algorithm 600 only provides notification when a change occurs, and does not require the component to periodically issue a query to determine whether a change has occurred. In addition, algorithm 600 avoids other problems that can exist with disseminating information about changes to system state, settings or configuration to other affected systems.

Figure 7:
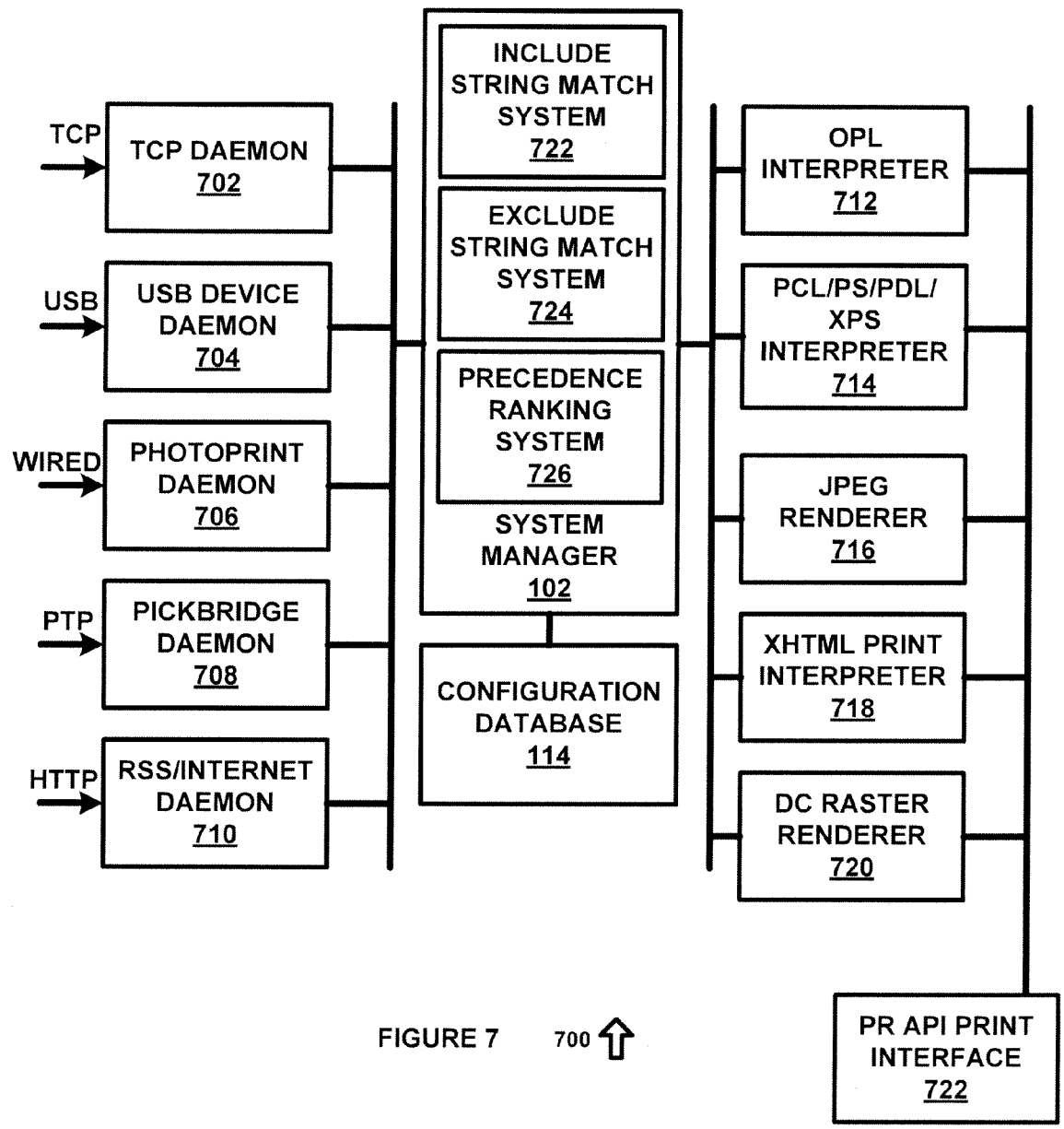
FIG. 7 is a diagram of a system for configurable application data steering in accordance with an exemplary embodiment of the present invention.

FIG. 7 is a diagram of a system 700 for configurable application data steering in accordance with an exemplary embodiment of the present invention. System 700 allows a data stream to be steered to an appropriate application without user selection of the application.

System 700 includes TCP daemon 702, USB device daemon 704, BlueTooth daemon 706, PictBridge daemon 708 and RSS/Internet daemon 710, each of which operate as a background process and monitor communications on one or more associated data ports, such as a transmission control protocol (TCP) port, a universal serial bus (USE) port, a wired port, a picture transfer protocol (PIP) port or a hypertext transfer protocol (HTTP) port. When a data is received at a data port, the associated daemon prepares a stream to contain the data. The daemon uses the first bytes of the file as a challenge and transmits a query to system manager 102 to identify the node of a PRINT_PROCESSOR class of applications which should be given the task of processing the data stream. If system manager 102 finds an application, it builds a sub-node in configuration database 114 that contains the parameters needed by the application. System manager 102 then launches the application.

In order to support launch in this manner, each application should have a record containing any defaults specific to the application. For instance, a "print-to-JPEG" application may have JPEG quantization settings that would not be provided by a universal daemon. The application also creates and populates an application defaults node. When a daemon launches a PRINT_PROCESSOR class application, the daemon can include a "DEFAULT" record that directs unresolved keys to the application specific default node.

A PRINT_PROCESSOR reads its input from a stream that is provided as a parameter. The application processors (such as a PDL application processors), can register as a member of an application class by specifying two regular expressions (an include string and an exclude string) and a precedence. When an agent, such as port input software, determines that it should start an application of a class, it presents a character string to be matched against the applications registered in that class. The algorithm may be optimized to reduce the number of regular expression matches.

System Manager 102 launches applications, such as OPL interpreter 712, PCL/PS/PDL/XPS interpreter 714, JPEG renderer 716, XHTML print interpreter 718 and DC raster renderer 720, and matches the string against the first of the regular expressions for each application in the class. For those which match, it then matches the second regular expression against the string—any of those which match result in the application being removed from consideration. Of those which remain, the application with the highest precedence is chosen. Through this algorithm, the knowledge of how to discriminate which application should be used is embodied in the application, not in the port handler. When different applications are included in a particular instance (implementation) of an MFP, the application registers the knowledge with the SY, and the port handling is not changed.

Include string match system 722 receives a data stream from one the daemons and compares the data stream with include string data for each of a plurality of applications. In one exemplary embodiment, the include string data can include a predetermined sequence of data in a single data field, groups of data sequences in different data fields, or other suitable combinations of data. Include string match system 722 generates an output that identifies one or more applications with matching include string data.

Exclude string match system 724 receives a data stream from one the daemons and compares the data stream with exclude string data for each of a plurality of applications. In one exemplary embodiment, the exclude string data can include a predetermined sequence of data in a single data field, groups of data sequences in different data fields, or other suitable combinations of data. Exclude string match system 724 generates an output that identifies one or more applications with matching exclude string data.

Precedence ranking system 726 receives two or more selected applications and selects one of the applications based on the precedence of each application. In one exemplary embodiment, each application can have an associated precedence, where the application with a higher precedence will be selected over an application with a lower precedence. In the event of equal precedence, the choice can be made randomly, by selecting the application registered first, the application registered later, by a user selection through a user interface prompt, an error can be reported, or other suitable processes can be used.

In operation, system 700 uses an input data stream to select between two or more potential applications that may use the data stream, by determining if an include pattern and an exclude pattern are present. If two or more applications have an include pattern and no exclude pattern, or an include pattern and an exclude pattern, then the application with the highest precedence is selected.

Figure 8:
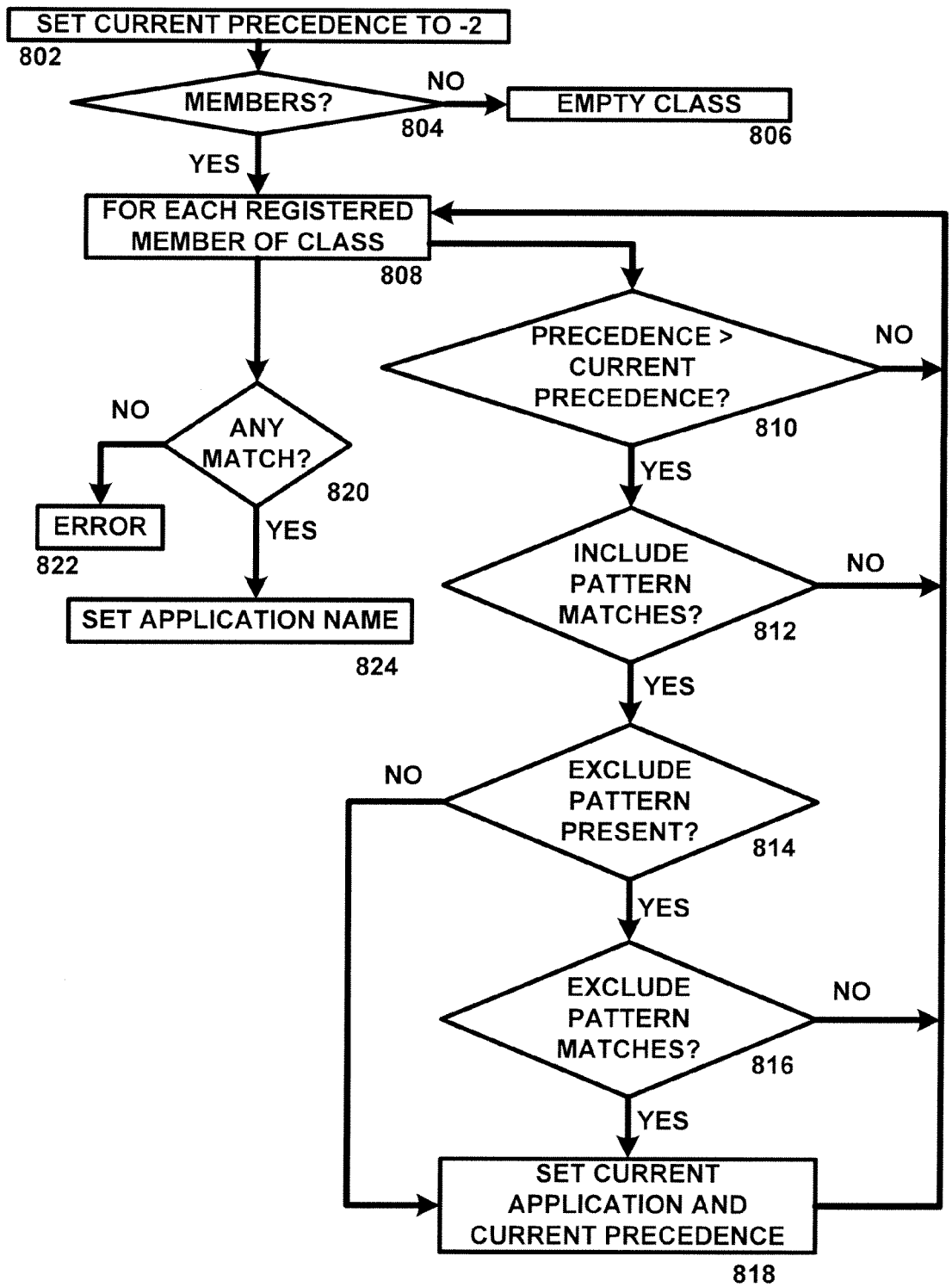
FIG. 8 is a diagram of an algorithm for configurable application data steering in accordance with an exemplary embodiment of the present invention.

FIG. 8 is a diagram of an algorithm 800 for configurable application data steering in accordance with an exemplary embodiment of the present invention. Algorithm 800 can be implemented in hardware or a suitable combination of hardware and software, such as by converting the flowchart algorithm to software code that will operate on a multi-function peripheral processor using standard programming techniques.

Algorithm 800 begins at 802, where a precedence variable is set to a predetermined starting value, such as −2. The starting precedence value can be set to prevent a false precedence value from a prior application selection process from being applied during a new application selection process or for other suitable purposes. The algorithm then proceeds to 804.

At 804, it is determined whether there are any registered members of a current class of applications that is to be searched. For example, if a print application is being searched, it can be determined whether there are any members of the print class of applications. If there are no members in the class, the algorithm proceeds to 806 where an empty class indicator is generated. The algorithm can then proceed to the next class, can terminate, or other suitable processes can be used.

If it is determined at 804 that there are registered members of the current class, the algorithm proceeds to 808 where a process is initiated for each registered member of the class. For each member, the algorithm proceeds to 810 where it is determined whether the precedence of the current class member is greater than a current value of the precedence. If not, then the algorithm returns to 808. Otherwise, the algorithm proceeds to 812.

At 812, it is determined whether an include pattern of the application matches any string contained within a received data stream. In one exemplary embodiment of the disclosure, the include strings can be specified as regular expressions, such as PERL programming language expressions. Thus, the include string can match a single string value (e.g. "ABCDEF"), multiple string values (e.g. "ABC" and "DEF"), multiple string values separated by a predetermined number of fields (e.g. "ABD" within five character values of "DEF") or other suitable string value or values. If it is determined that the include string of the application does not match any sequence of characters contained within a received data stream, the algorithm returns to 808, otherwise the algorithm proceeds to 814.

At 814, it is determined whether an exclude string is available for the application. For example, an application might not be amenable to exclude string processing, such as where an exclude string need not be identified. If there is no exclude string for the application, the algorithm proceeds to 818, otherwise the algorithm proceeds to 816 if an exclude string is present for the application.

At 816, it is determined whether the exclude string of the application matches any string contained within a received data stream. In an exemplary embodiment of the disclosure, the exclude strings can be specified as regular expressions, such as PERL programming language expressions. Thus, the exclude string can a single string value (e.g. "ABCDEF"), multiple string values (e.g. "ABC" and "DEF"), multiple string values separated by a predetermined number of fields (e.g. "ABD" within five character values of "DEF") or other suitable string value or values. If it is determined that the exclude string of the application matches any sequence of characters contained within a received data stream, the algorithm returns to 808, otherwise the algorithm proceeds to 818.

At 818, the values of an application variable (such as the name of an application) and a precedence variable are set to equal the values for the current application being processed. The algorithm then returns to 808.

After processing each member of the class, the algorithm proceeds to 820 where it is determined whether any matching application has been identified. If no matching application has been identified, the algorithm proceeds to 822 where an error indicator is generated. Otherwise, the algorithm proceeds to 824 where the currently selected application is used to process the data stream.

It should be emphasized that the above-described embodiments are merely examples of possible implementations. Suitable variations and modifications can be made to the above-described embodiments without departing from the principles of the present disclosure. All such modifications and variations are intended to be included herein within the scope of this disclosure and protected by the following claims.

What is claimed is:

1. A system for application management comprising:
a processor;
a memory having a plurality of applications, each having an associated precedence, an include data string and an exclude data string;
a plurality of daemons, each for monitoring a data port and extracting a data stream received at the data port; and
a system manager for receiving the precedence, the include data string and the exclude data string for each application and an extracted data stream from one of the daemons and selecting one of the plurality of applications as a function of the precedence, the include data string and the exclude data string for each application by setting an initial precedence reference value and comparing the precedence of each application to the precedence reference value, wherein the system manager further comprises:
  an include string match system for receiving the extracted data stream, comparing the include data string for each application to the extracted data stream, and generating an output that identifies each of the applications for which the include data string matched the data stream;
  an exclude string match system for receiving the extracted data stream, comparing the exclude data string for each application to the extracted data stream, and generating an output that identifies each of the applications for which the exclude data string matched the data stream; and
  a precedence ranking system for receiving an identification of each of the applications for which the include data string matched the data stream and selecting one of the applications that has a highest precedence.

2. The system of claim 1 wherein the associated precedence, the include data string and the exclude data string is received from a configuration database.

3. The system of claim 1 wherein an identification of the extracted data stream is received from a notify node of a configuration database.

4. The system of claim 1 wherein the plurality of applications, the plurality of daemons and the system manager communicate by storing data in a configuration database.

5. The system of claim 1 further comprising one or more PDL application processor configured to register as a member of an application class by specifying an include string, an exclude string and a precedence.

6. A method for application management comprising:
receiving an input data stream;
comparing the input data stream to a plurality of include data strings, each include data string is associated with an application;
setting a reference precedence value;
comparing a precedence value of the applications to the reference precedence value;
selecting one or more applications having an include data string that matches the input data stream and a lowest precedence value;
receiving an identification of each of the one or more applications for which the include data string matched the data stream and selecting the one of the one or more applications that has a highest precedence by a precedence ranking system;
comparing the input data stream to a plurality of exclude data strings, each exclude data string associated with an application;
excluding the one or more of the selected applications having an exclude data string that matches the input data stream;
wherein comparing the input data stream to the plurality of include data strings further comprises comparing the input data stream to two or more separate data fields of one of the include data strings;
wherein comparing the input data stream to the plurality of exclude data strings further comprises comparing the input data stream to two or more separate data fields of one of the exclude data strings; and
determining a precedence associated with each of the selected applications.

7. The method of claim 6 further comprising selecting one of two or more selected applications as a function of the precedence of each of the two or more selected applications.

8. The method of claim 6 further comprising registering one or more PDL application processor as a member of an application class by specifying an include string, an exclude string and a precedence.

9. A method for application management comprising:
receiving an input data stream;
comparing the input data stream to a plurality of include data strings, each include data string associated with an application, wherein comparing the input data stream to the plurality of include data strings further comprises comparing the input data stream to two or more separate data fields of one of the include data strings;
selecting one or more applications having an include data string that matches the input data stream;
comparing the input data stream to a plurality of exclude data strings, each exclude data string associated with an application, wherein comparing the input data stream to the plurality of exclude data strings further comprises comparing the input data stream to two or more separate data fields of one of the exclude data strings;
excluding one or more of the selected applications having an exclude data string that matches the input data stream;
determining a precedence associated with each of the selected applications; and
selecting one of two or more selected applications as a function of the precedence of each of the two or more selected applications; and
receiving an identification of each of the applications for which the include data string matched the data stream and selecting one of the applications that has a highest precedence by a precedence ranking system.

10. The method of claim 9 further comprising registering one or more PDL application processor as a member of an application class by specifying an include string, an exclude string and a precedence.

* * * * *

UNITED STATES PATENT AND TRADEMARK OFFICE
CERTIFICATE OF CORRECTION

PATENT NO. : 8,578,398 B2  
APPLICATION NO. : 13/149713  
DATED : November 5, 2013  
INVENTOR(S) : Carl Mikkelsen Page 1 of 1

It is certified that error appears in the above-identified patent and that said Letters Patent is hereby corrected as shown below:

In the Claims:

Column 15, line 54, replace "applications" with "application"

Signed and Sealed this  
Seventh Day of January, 2014

Margaret A. Focarino  
*Commissioner for Patents of the United States Patent and Trademark Office*